United States Patent
Sheng et al.

(10) Patent No.: US 8,502,510 B2
(45) Date of Patent: Aug. 6, 2013

(54) SWITCHING MODE POWER SUPPLY WITH PREDICTED PWM CONTROL

(75) Inventors: Honggang Sheng, Milpitas, CA (US); Chia-Hsin Chang, Santa Clara, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 259 days.

(21) Appl. No.: 13/016,752

(22) Filed: Jan. 28, 2011

(65) Prior Publication Data

US 2012/0194145 A1 Aug. 2, 2012

(51) Int. Cl.
*G05F 1/656* (2006.01)
*G05F 1/613* (2006.01)

(52) U.S. Cl.
USPC ............ 323/223; 323/222; 323/282; 323/284; 323/285

(58) Field of Classification Search
USPC .......................... 323/222, 223, 284, 282, 285
See application file for complete search history.

(56) References Cited

U.S. PATENT DOCUMENTS

| | | | |
|---|---|---|---|
| 5,663,667 A * | 9/1997 | Blum et al. | 327/134 |
| 6,201,417 B1 * | 3/2001 | Blum et al. | 327/14 |
| 7,453,246 B2 * | 11/2008 | Qiu et al. | 323/282 |
| 7,489,119 B2 * | 2/2009 | Smith et al. | 323/283 |
| 7,710,092 B2 * | 5/2010 | Chapuis et al. | 323/282 |
| 7,782,038 B2 * | 8/2010 | Klein | 323/285 |
| 8,305,053 B2 * | 11/2012 | Truong et al. | 323/224 |
| 2008/0232144 A1 * | 9/2008 | Klein | 363/49 |
| 2012/0043950 A1 * | 2/2012 | Truong et al. | 323/282 |

* cited by examiner

*Primary Examiner* — Bao Q Vu
(74) *Attorney, Agent, or Firm* — Perkins Coie LLP

(57) ABSTRACT

The present technology discloses a switching mode power supply with predicted PWM control. In one embodiment, the switching mode power supply monitors the slew rate of COMP signal which represents the output voltage of the switching mode power supply. When the load steps up, the ON state of the power stage is prolonged; when the load steps down, the power stage is turned off earlier.

25 Claims, 12 Drawing Sheets

SWITCHING MODE POWER SUPPLY WITH PREDICTED PWM CONTROL

TECHNICAL FIELD

The technology described in this patent document relates generally to switching mode power supplies.

BACKGROUND

Switching mode power supplies are widely used due to high efficiencies and small sizes. In a typical switching mode power supply, a pulse width modulation ("PWM") control scheme is commonly used. However, with traditional PWM control, the switching mode power supply generates pulses only according to an absolute COMP value.

FIG. 1 illustrates a schematic circuit of a prior art switching mode power supply 100. As shown in FIG. 1, the switching mode power supply 100 comprises a power stage 101 configured to receive an input voltage ($V_{IN}$), and provides an output voltage ($V_{OUT}$) based on a driving signal. A feedback circuit 102 provides a feedback signal derived from a load to an error amplifier 103 configured to receive the feedback signal and a voltage reference ($V_{REF}$), and amplifies the difference between the feedback signal and the voltage reference to provide an error amplified signal, i.e., a COMP signal ($V_{CMP}$). A controller (e.g., a PWM generator) 104 generates a PWM signal in response to the COMP signal and a current sense signal from the power stage. A driver 105 provides the driving signal to the power stage 101 in response to the PWM signal, so that the power stage 101 provides the desired output voltage ($V_{OUT}$).

In the switching mode power supply 100, the PWM generator generates the PWM pulses according to an absolute COMP value. Even if the output voltage ($V_{OUT}$) is going up, the PWM generator continuously generates PWM pulses as long as the COMP signal ($V_{CMP}$) is high. This results in a ring back and worsens a transient performance of the switching mode power supply 100. So there is a need for switching mode power supplies with improved PWM control.

DETAILED DESCRIPTION

Embodiments of circuits and devices for switching mode power supplies with improved PWM control schemes are described in detail herein. For example, in one embodiment, a switching mode power supply includes a power stage, a feedback circuit, an error amplifier, a PWM generator, a predicted PWM circuit, and a driver. The power stage is configured to receive an input voltage and convert the input voltage to an output voltage supplied to a load based on a driving signal. The feedback circuit is configured to provide a feedback signal which is derived from the load. The error amplifier is configured to receive the feedback signal and a voltage reference, and provide a COMP signal based thereon. The COMP signal has a rising slew rate and a falling slew rate. The PWM generator is configured to receive the COMP signal, and based on the COMP signal, generate a PWM signal. The predicted PWM circuit is configured to receive the COMP signal and the PWM signal, and based on the PWM signal and the slew rate of the COMP signal, provide a predicted PWM signal. The driver is configured to receive the predicted PWM signal and provide the driving signal to the power stage based on the predicted PWM signal.

In another embodiment, a method useful in a switching mode power supply includes monitoring a slew rate of a COMP signal which represents an output voltage of the switching mode power supply; generating a first pulse to prolong an ON state of the power stage when a load of the switching mode power supply steps up; and generating a second pulse to turn off the power stage when the load of the switching mode power supply steps down.

In the following description, several of the details set forth below are provided to describe the following embodiments in a manner sufficient to enable a person skilled in the relevant art to make and use the disclosed embodiments. Several of the details described below, however, may not be necessary to practice certain embodiments of the technology. Additionally, the technology can include other embodiments that are within the scope of the claims but are not described in detail with respect to FIGS. 2A-9.

Figure 1:
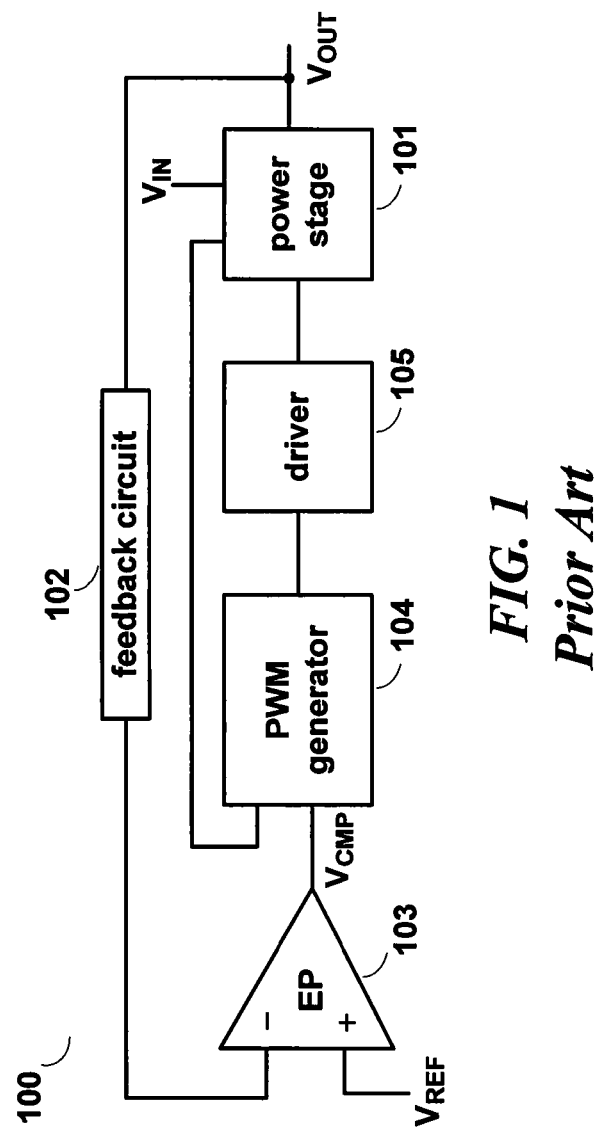
FIG. 1 illustrates a schematic circuit of a prior art switching mode power supply 100.
Figure 2A:
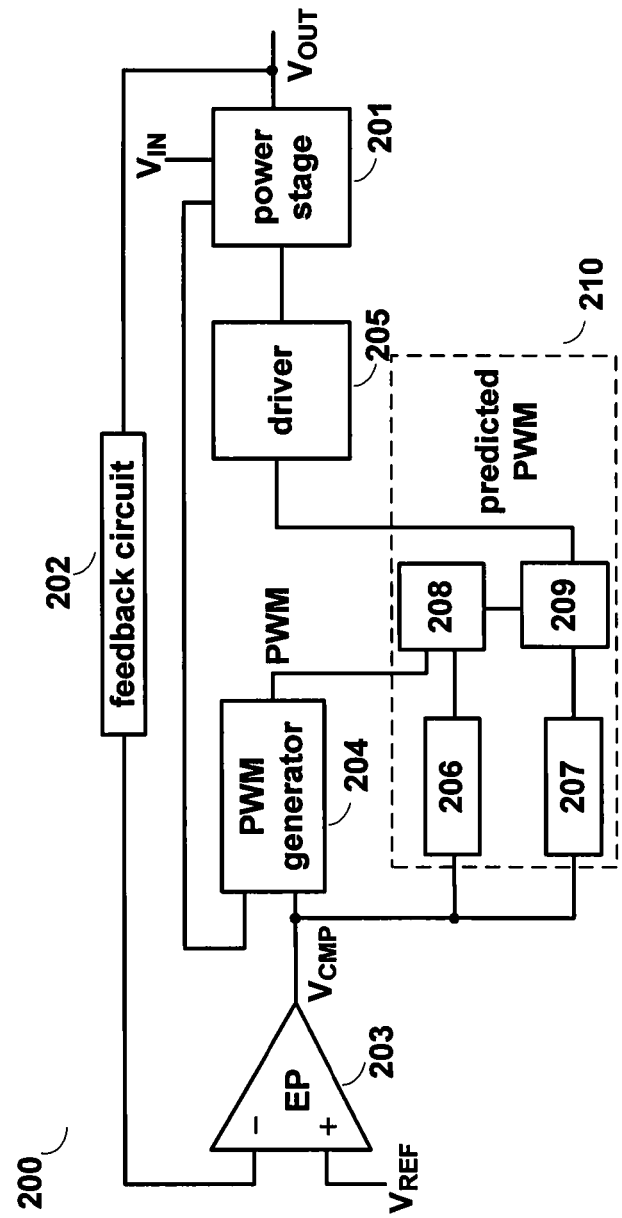
FIG. 2A illustrates a schematic circuit of a switching mode power supply 200 in accordance with an embodiment of the present technology.
Figure 2B:
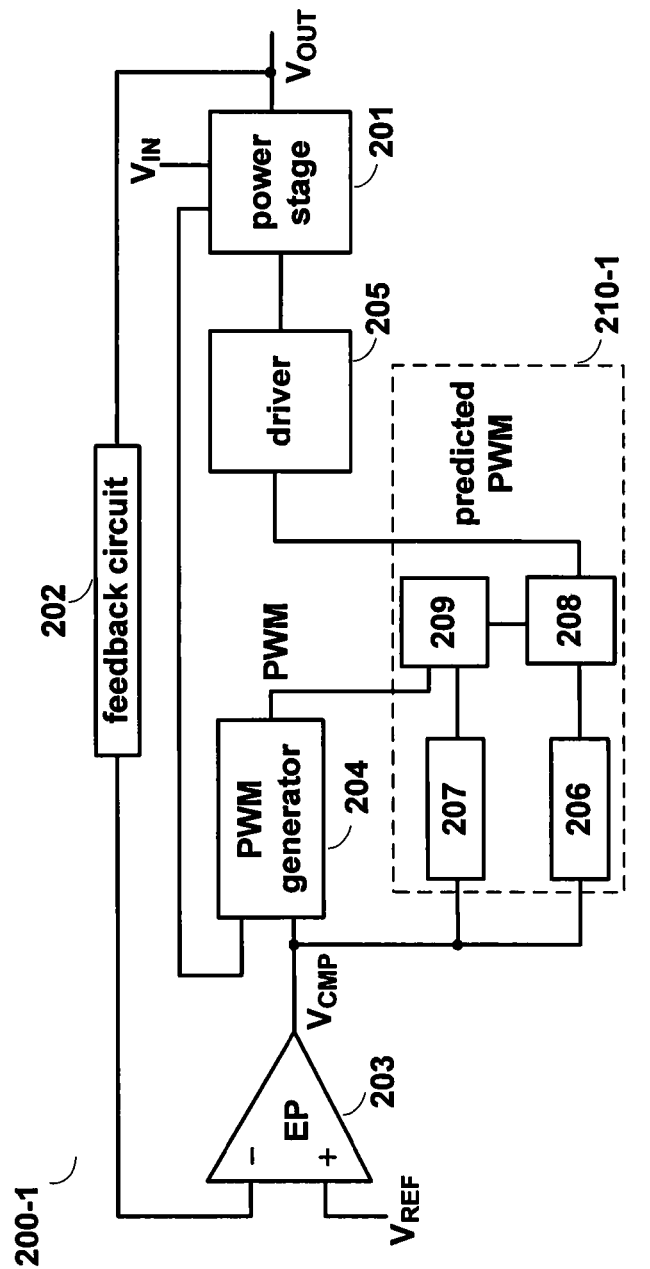
FIG. 2B illustrates a schematic circuit of a switching mode power supply 200-1 in accordance with another embodiment of the present technology.

FIG. 2A illustrates a schematic circuit of a switching mode power supply 200 in accordance with an embodiment of the present technology. As shown in FIG. 2A, the switching mode power supply 200 comprises a power stage 201, a feedback circuit 202, an error amplifier 203, a PWM generator 204, a predicted PWM circuit 210, and a driver 205 operatively coupled to one another. Even though only the foregoing particular components are shown and discussed below, in other embodiments, the switching mode power supply 200 can also include other suitable circuits and/or components.

The power stage 201 is configured to receive an input voltage ($V_{IN}$), and based on a driving signal, convert the input signal to an output voltage ($V_{OUT}$) supplied to a load. The feedback circuit 202 is configured to receive a feedback signal derived from the load. The error amplifier 203 is configured to receive the feedback signal and a voltage reference ($V_{REF}$) and provide a COMP signal ($V_{CMP}$) based thereon. The COMP signal ($V_{CMP}$) has a rising slew rate and a falling slew rate.

The PWM generator 204 is configured to receive the COMP signal ($V_{CMP}$), and based on the COMP signal ($V_{CMP}$), generate a PWM signal. The predicted PWM circuit 210 is configured to receive the COMP signal ($V_{CMP}$) and the PWM signal. Based on the PWM signal and the slew rate of the COMP signal ($V_{CMP}$), the predicted PWM circuit 210 provides a predicted PWM signal. The driver 205 is configured to receive the predicted PWM signal and based thereon, the driver 205 provides a driving signal to the power stage 201. Different to the switching mode power supply 100, the PWM signal generated by the PWM generator 204 is not sent to the driver 205 directly. Instead, the PWM signal is sent to the predicted PWM circuit 210 to derive the predicted PWM signal, which is sent to the driver 205 for driving the power stage 201.

In one embodiment, when the load steps up, the COMP signal increases. If the rising slew rate of the COMP signal is higher than a first preset value, an ON state of the power stage 201 is prolonged than in conventional switching mode power supplies. When the load steps down, the COMP signal decreases. If the falling slew rate of the COMP signal is higher than a second preset value, the power stage 201 is turned off earlier than in conventional switching mode power supplies.

In one embodiment, the predicted PWM circuit 210 comprises a predicted step-up pulse unit 206, a predicted step-down pulse unit 207, a logical OR unit 208, and a logical AND unit 209. The predicted step-up pulse unit 206 is coupled to the COMP signal ($V_{CMP}$), so as to monitor the slew rate of the COMP signal ($V_{CMP}$), and to generate an additional pulse and/or prolong the existing ON pulse in response to a load step up. The predicted step-down pulse unit 207 is also coupled to the COMP signal ($V_{CMP}$) to monitor the slew rate of the COMP signal ($V_{CMP}$), and generate a low pulse to turn off the power stage earlier in response to a load step down.

In one embodiment, the predicted step-up pulse unit 206 receives the COMP signal ($V_{CMP}$), and provides a first pulse when the rising slew rate of the COMP signal is higher than the first preset value. Thus, when the load of the switching mode power supply 200 steps up, the predicted step-up pulse unit 206 generates the first pulse (also referred to as a predicated step-up pulse), which is added into the PWM signal through the logical OR unit 208. Therefore, the driving signal is prolonged with the added additional pulse. Accordingly, the equivalent ON state of the power stage 201 is prolonged, and the output voltage ($V_{OUT}$) provided by the power stage 201 increases to improve transient performance.

The predicted step-down pulse unit 207 receives the COMP signal ($V_{CMP}$), and can provide a second pulse when the falling slew rate of the COMP signal is higher than the second preset value. Thus, when the load of the switching mode power supply 200 steps down, the predicted step-down pulse unit 207 generates the second pulse (also referred to as a predicated step-down pulse), which is added to the driving signal through the logical AND unit 209. Therefore, the driving signal is shortened or even blocked. Accordingly, the power stage 201 is turned off earlier than without the predicated step-down pulse. As a result, the output voltage ($V_{OUT}$) provided by the power stage 201 decreases to improve transient performance.

In one embodiment, the logical OR unit 208 is coupled to the predicted step-up pulse unit 206 and the PWM generator 204 for receiving the first pulse and the PWM signal, and providing a predicted step-up PWM signal in response to the first pulse and the PWM signal. The logical AND unit 209 is coupled to the predicted step-down unit 207 and the logical OR unit 208, for receiving the second pulse and the predicted step-up PWM signal, and providing the predicted PWM signal in response to the second pulse and the predicted step-up PWM signal, as shown in FIG. 2A.

In another embodiment, the logical AND unit 209 is coupled to the predicted step-down pulse unit 207 and the PWM generator 204, for receiving the second pulse and the PWM signal, and providing a predicted step-down PWM signal in response to the second pulse and the PWM signal. The logical OR unit 208 is coupled to the predicted step-up unit 206 and the logical AND unit 209, for receiving the first pulse and the predicted step-down PWM signal, and providing the predicted PWM signal in response to the first pulse and the predicted step-down PWM signal, as shown in a switching mode power supply 200-1 in FIG. 2B.

Figure 2C:
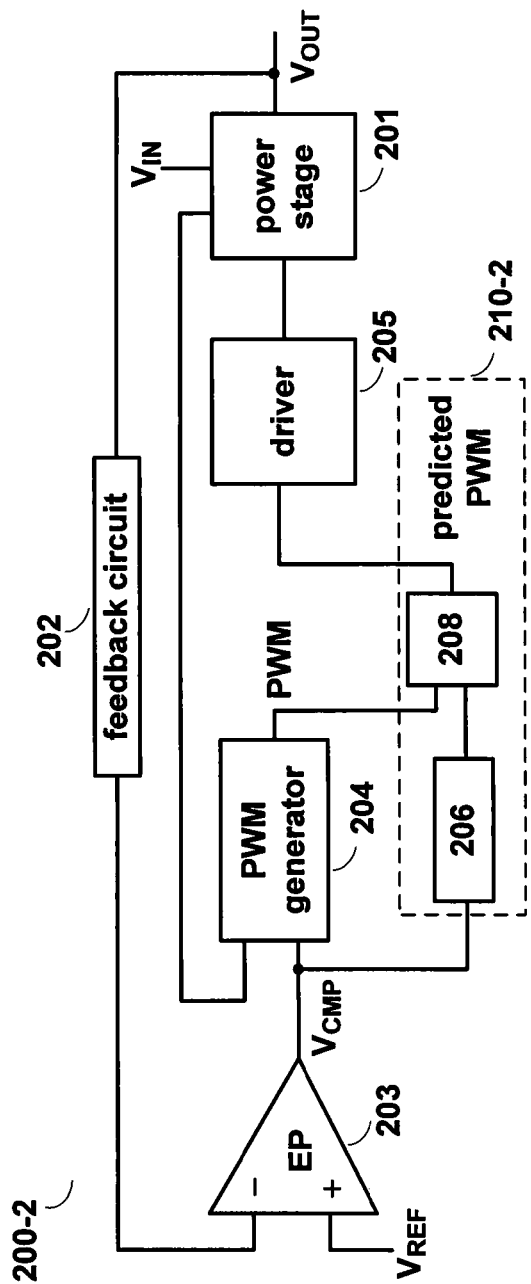
FIG. 2C illustrates a schematic circuit of a switching mode power supply 200-2 in accordance with yet another embodiment of the present technology.

In yet another embodiment, a switching mode power supply 200-2 may only include a predicted step-up component, as shown in FIG. 2C. The predicted PWM circuit 210-2 configured to provide a predicted step-up PWM signal comprises a predicted step-up unit 206 and a logical OR unit 208. The logical OR unit 208 is coupled to the predicted step-up unit 206 and the PWM generator 204, for receiving the first pulse and the PWM signal, and providing the predicted PWM signal to the driver 205 in response to the first pulse and the PWM signal.

Figure 2D:
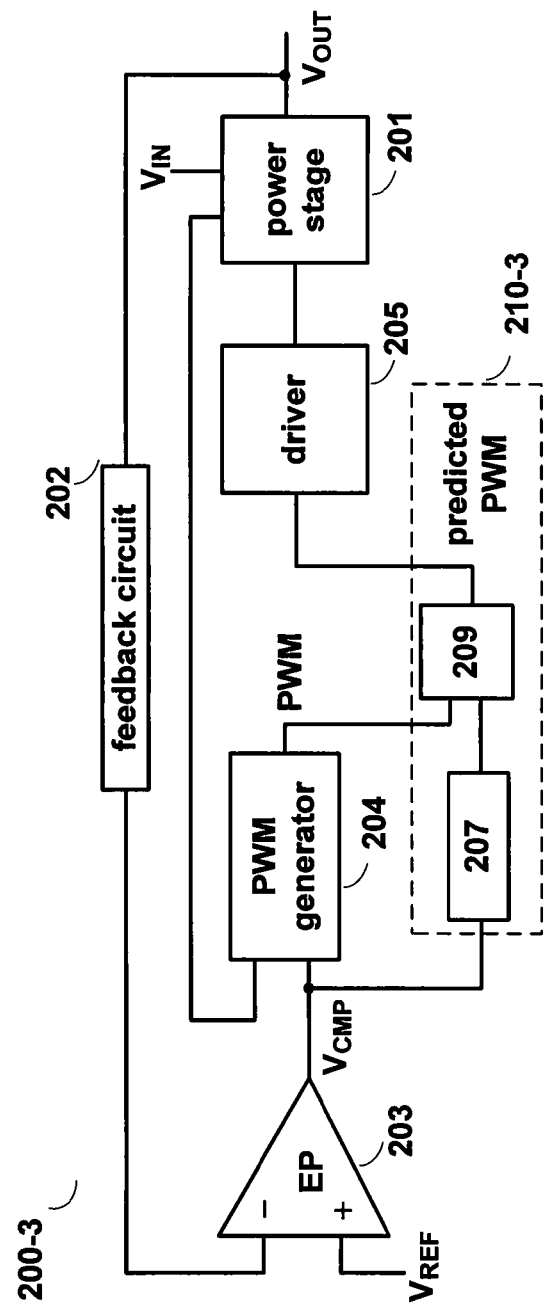
FIG. 2D illustrates a schematic circuit of a switching mode power supply 200-3 in accordance with yet another embodiment of the present technology.

In a further embodiment, a switching mode power supply 200-3 may only include a predicted step-down component, as shown in FIG. 2D. A predicted PWM circuit 210-3 configured to provide a predicted step-down PWM signal comprises a predicted step-down unit 207 and a logical AND unit 209. The logical AND unit 209 is coupled to the predicted step-down unit 207 and the PWM generator 204, for receiving the second pulse and the PWM signal, and providing the predicted PWM signal to the driver 205 in response to the second pulse and the PWM signal.

Figure 3:
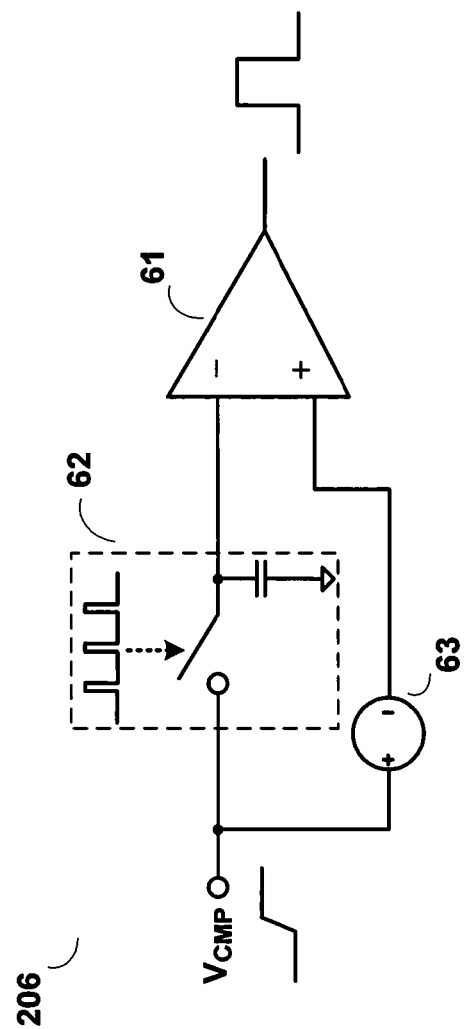
FIG. 3 illustrates a schematic circuit of a predicted step-up pulse unit 206 in accordance with yet another embodiment of the present technology.

FIG. 3 illustrates a schematic circuit of a predicted step-up pulse unit 206 suitable for use in the switching mode power supplies in FIGS. 2A-2D. The step-up unit 206 comprises a comparator 61, a sample-and-hold circuit 62, and a first bias circuit 63. In one embodiment, the sample-and-hold circuit 62 receives the COMP signal ($V_{CMP}$), and based on the COMP signal ($V_{CMP}$), the sample-and-hold circuit 62 provides a sample-held signal. The first bias circuit 63 is coupled between the COMP signal ($V_{CMP}$) and the non-inverting input terminal of the comparator 61. The comparator 61 receives the sample-held signal at its inverting input terminal.

In one embodiment, the first bias voltage circuit 63 comprises a negative voltage source, so as to bias the COMP signal ($V_{CMP}$) to get a first bias signal lower than the COMP signal ($V_{CMP}$). The sample-and-held circuit 62 can comprise a switch and a capacitor. The switch is coupled between the COMP signal ($V_{CMP}$) and the inverting input terminal of the comparator 61. The capacitor is coupled between the inverting input terminal of the comparator 61 and a reference ground. In one embodiment, the switch may be controlled by clock signals.

The first preset value may be determined based on the bias voltage of the first bias circuit and the frequency of the sample-and-hold circuit. For example, in certain embodiments, the first preset value may be equal to the bias voltage of the first bias circuit 63 multiplied by the frequency of the sample-and-hold signal 62. In other embodiments, the first preset value may have other suitable values.

When the switching mode power supply 200 is in a steady state, the COMP signal ($V_{CMP}$) which represents the output voltage ($V_{OUT}$) is relatively constant. So the capacitor voltage is generally equal to that of the COMP signal ($V_{CMP}$), i.e., the voltage of the sample-held signal is equal to that of the COMP signal ($V_{CMP}$). And the sample-held signal is higher than the first bias signal, i.e., the voltage at the inverting input terminal of the comparator 61 is higher than that at the non-inverting input terminal of the comparator 61. Accordingly, the output of the comparator 61 is low. As a result, the output of the logical OR unit 208, i.e., the predicted step-up PWM signal follows the PWM signal generated by the PWM generator 204. In addition, the output of the logical AND unit 209 also follows the PWM signal.

Similarly, when the switching mode power supply 200-1 or the switching mode power supply 200-2 is in a steady state, the output of the logical OR unit 208, i.e., the predicted PWM signal follows the PWM signal generated by the PWM generator 204. Thus, in steady state, no effect is added to the driving signal. When the switching mode power supply 200-3 is in a steady state, the output of the logical AND unit 209, i.e., the predicted PWM signal follows the PWM signal generated by the PWM generator 204. Thus, in a steady state, generally no effect is added to the driving signal.

When the load of the switching mode power supplies 200, 200-1, 200-2, and 200-3 step down, the output voltage ($V_{OUT}$) goes up, and the COMP signal ($V_{CMP}$) goes down through the error amplifier 203. However, the sample-held signal maintains the previous voltage of the COMP signal ($V_{CMP}$) because of the hold effect of the capacitor. So the voltage at the inverting input terminal of the comparator 61 is still higher than that at the non-inverting input terminal of the comparator 61. Accordingly, the output of the comparator 61 is low. As a result, the output of the logical OR unit 208, i.e., the predicted step-up pulse PWM signal follows the PWM signal generated by the PWM generator 204. The predicted PWM signal will be varied from the PWM signal by the output of the predicted step-down unit 207 during a load step down, which will be detailed hereinafter.

When the load of the switching mode power supplies 200, 200-1, 200-2, and 200-3 step up, the output voltage ($V_{OUT}$) goes down, and the COMP signal ($V_{CMP}$) goes up through the error amplifier 203. The voltage at the non-inverting input terminal of the comparator 61 follows the COMP signal ($V_{CMP}$). However, as illustrated hereinbefore, the sample-held signal is the previous voltage of the COMP signal ($V_{CMP}$). If the rising slew rate of the COMP signal is higher than the first preset value, the first bias signal will increase quickly, so that it goes higher than the sample-held signal, i.e., the voltage at the inverting input terminal of the comparator 61 becomes lower than that at the non-inverting input terminal of the comparator 61. Accordingly, the output of the comparator 61 goes high, and a high pulse is generated for load step up. As a result, the output of the logical OR unit 208, i.e., the predicted step-up pulse PWM signal is prolonged or an additional pulse is generated.

Figure 4:
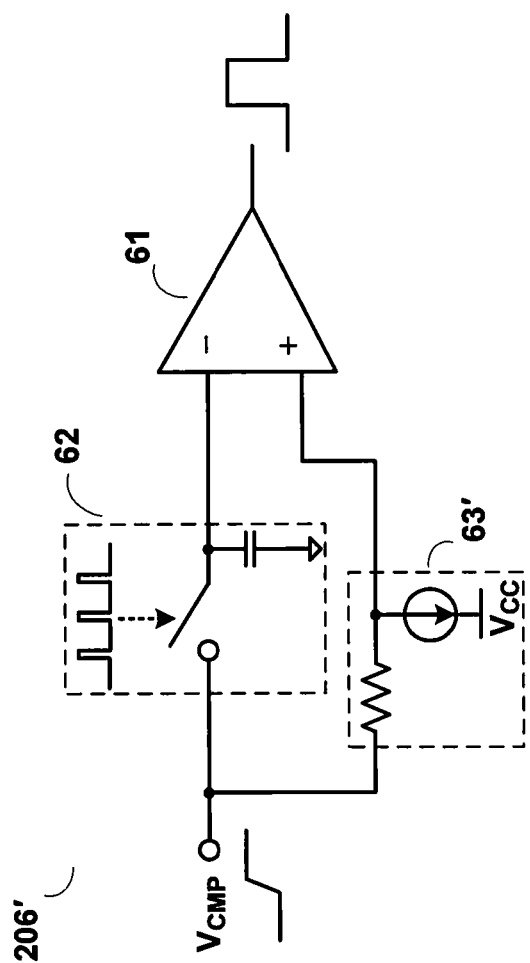
FIG. 4 illustrates a schematic circuit of a predicted step-up pulse unit 206' in accordance with yet another embodiment of the present technology.

FIG. 4 illustrates a schematic circuit of a predicted step-up pulse unit 206' in accordance with yet another embodiment of the present technology. Different to the predicted step-up pulse unit 206 in FIG. 3, the first bias circuit 63' in the predicted step-up pulse unit 206' adopts a resistor and a current source instead of a voltage source. In one embodiment, the first bias circuit 63' includes a resistor coupled between the COMP signal ($V_{CMP}$) and the non-inverting input terminal of the comparator 61, and a current source coupled between the non-inverting input terminal of the comparator 61 and a reference voltage ($V_{CC}$). The current source provides a current flow into the reference voltage, so as to insure the voltage at the non-inverting input of the comparator 61 is lower than the COMP signal ($V_{CMP}$). The operation principle of the predicted step-up pulse circuit 206' is similar to that of the predicted step-up pulse circuit 206.

Figure 5:
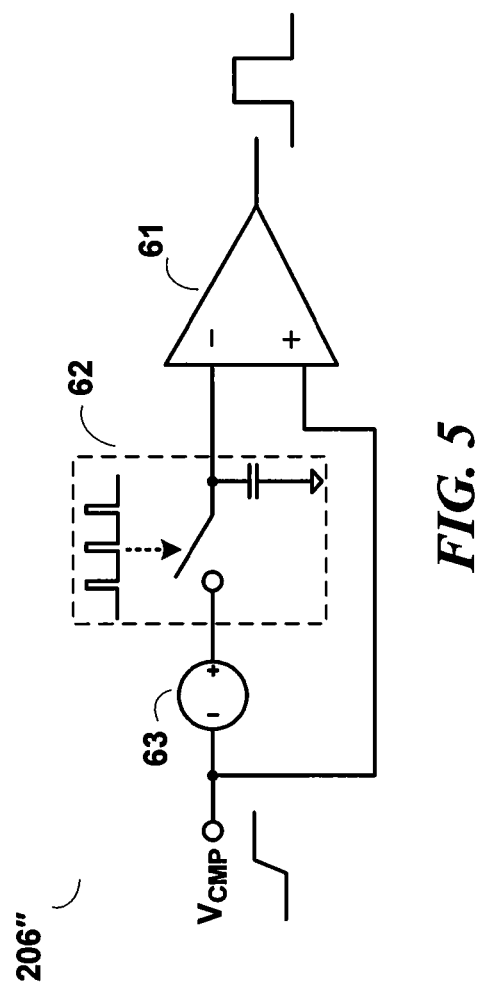
FIG. 5 illustrates a schematic circuit of a predicted step-up pulse unit 206" in accordance with yet another embodiment of the present technology.

FIG. 5 illustrates a schematic circuit of a predicted step-up pulse unit 206" in accordance with yet another embodiment of the present technology. Different to the predicted step-up pulse unit 206 in FIG. 3, the first bias circuit 63 in the predicted step-up pulse unit 206" is serially coupled to the sample-and-hold circuit 62 between the COMP signal ($V_{CMP}$) and the inverting input terminal of the comparator 61, so as to bias the voltage at the inverting input terminal of the comparator to be higher than the COMP signal ($V_{CMP}$) when the switching mode power supply 200 is in a steady state. Thus, the COMP signal ($V_{CMP}$) is first biased by the first bias circuit 63 to get a first bias signal higher than the COMP signal ($V_{CMP}$) when the switching mode power supply is in a steady state. Then the first bias signal is held by the sample-and-hold circuit 62 to get a sample-held signal. In addition, the non-inverting input terminal of the comparator 61 in the predicted step-up pulse unit 206" is coupled to the COMP signal ($V_{CMP}$). The operation principle of the predicted step-up pulse unit 206" is generally similar to that of the predicted step-up pulse unit 206.

Figure 6:
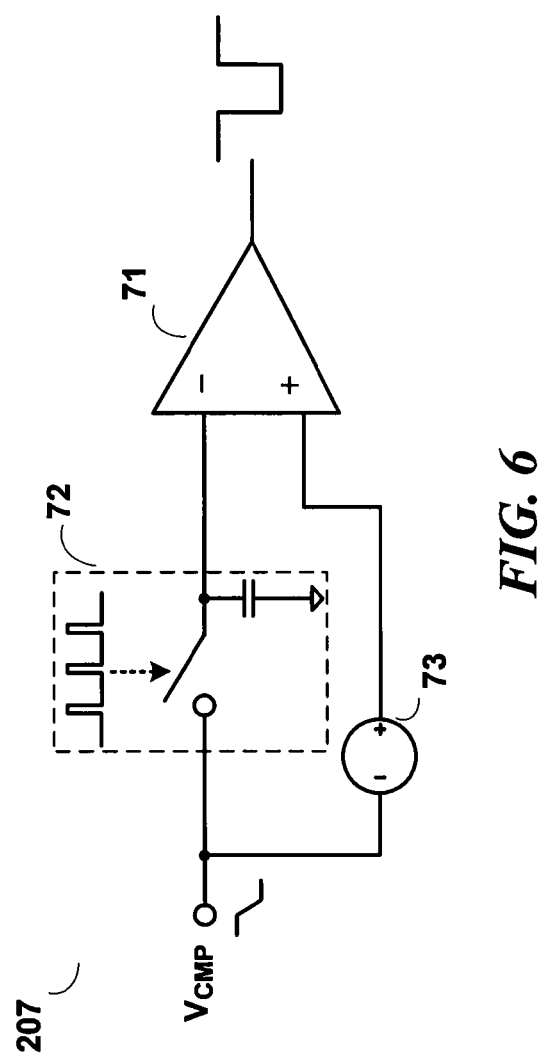
FIG. 6 illustrates a schematic circuit of a predicted step-down pulse unit 207 in accordance with yet another embodiment of the present technology.

FIG. 6 illustrates a schematic circuit of a predicted step-down pulse unit 207 in accordance with yet another embodiment of the present technology. The predicted step-down pulse unit 207 comprises a comparator 71, a sample-and-hold circuit 72, and a second bias circuit 73. In one embodiment, the sample-and-hold circuit 72 receives the COMP signal ($V_{CMP}$), and provides a sample-held signal based on the COMP signal ($V_{CMP}$). The second bias circuit 73 is coupled between the COMP signal ($V_{CMP}$) and the non-inverting input terminal of the comparator 71. The comparator 71 receives the sample-held signal at its inverting input terminal. The second preset value can be determined based on the frequency of the sample-and-hold circuit 72 and the bias voltage of the second bias circuit 73. For example, in one embodiment, the second preset value may be equal to the bias voltage of the second bias circuit 73 multiplied by the frequency of the sample-and-hold signal 72. In other embodiments, the second preset value may have other suitable values.

In one embodiment, the second bias circuit 73 comprises a positive voltage source, so as to bias the COMP signal ($V_{CMP}$) to get a second bias signal higher than the COMP signal ($V_{CMP}$). The sample-and-hold circuit 72 comprises a switch and a capacitor. The switch is coupled between the COMP signal ($V_{CMP}$) and the inverting input terminal of the comparator 71. The capacitor is coupled between the inverting input terminal of the comparator 71 and the reference ground. The switch may be controlled by a clock signal and/or other suitable signals.

When the switching mode power supply 200 is in a steady state, the COMP signal (VCMP) which represents the output voltage (VOUT) is relatively constant. So the voltage integrated in the capacitor is equal to that of the COMP signal (VCMP), i.e., the voltage of the sample-held signal is equal to that of the COMP signal (VCMP). And the sample-held signal is lower than the second bias signal, i.e., the voltage at the inverting input terminal of the comparator 71 is lower than that at the non-inverting input terminal of the comparator 71. Accordingly, the output of the comparator 71 is high. As illustrated hereinbefore, the output of the predicted step-up pulse unit 206 follows the PWM signal during a steady state. As a result, the output of the logical AND unit 209, i.e., the predicted PWM signal follows the PWM signal generated by the PWM generator 204. So there is no effect added to the driving signal during the steady state.

Similarly, when the switching mode power supply 200-1 and/or the switching mode power supply 200-3 is in steady state, there is no effect added to the driving signal.

When the load of the switching mode power supply 200 steps up, the output voltage ($V_{OUT}$) goes down, and the COMP signal ($V_{CMP}$) goes up through the error amplifier 203. However, the sample-held signal keeps the previous voltage of the COMP signal ($V_{CMP}$) because of the hold effect of the capacitor. So the voltage at the inverting input terminal of the comparator 71 is still lower than that at the non-inverting input terminal of the comparator 71. Accordingly, the output of the comparator 71 is high. As a result, the output of the logical AND unit 209. i.e., the predicted PWM signal follows the predicted step-up PWM signal provided by the logical OR unit 208. As illustrated hereinbefore, the predicted PWM signal is prolonged or an additional pulse is generated for driving the power stage 201 for load step up, and the converter transient performance is improved. Similarly, when the load of the switching mode power supply 200-1 and/or the switching mode power supply 200-2 steps up, the predicted PWM signal is prolonged or an additional pulse is generated for driving the power stage 201.

When the load of the switching mode power supply 200 steps down, the output voltage ($V_{OUT}$) goes up, and the COMP signal ($V_{CMP}$) goes down through the error amplifier 203. The voltage at the non-inverting input terminal of the comparator 71 follows the COMP signal ($V_{CMP}$). However, as illustrated hereinbefore, the sample-held signal is the previous voltage of the COMP signal ($V_{CMP}$). If the falling slew rate of the COMP signal is higher than the second preset value, the second bias signal will decrease quickly, so that it goes lower than the sample-held signal, i.e., the voltage at the inverting input terminal of the comparator 71 becomes higher than that at the non-inverting input terminal of the comparator 71. Accordingly, the output of the comparator 71 goes low; a low pulse is generated for load step down. As illustrated hereinbefore, the predicted step-up PWM signal follows the PWM signal during load step down. As a result, the output of the logical AND unit 209, i.e., the predicted PWM is shortened or blocked when the load steps down. Similarly, when the load of the switching mode power supply 200-1 and/or the switching mode power supply 200-3 steps down, the predicted PWM is shortened or blocked when the load steps down, and the converter transient performance is improved.

Figure 7:
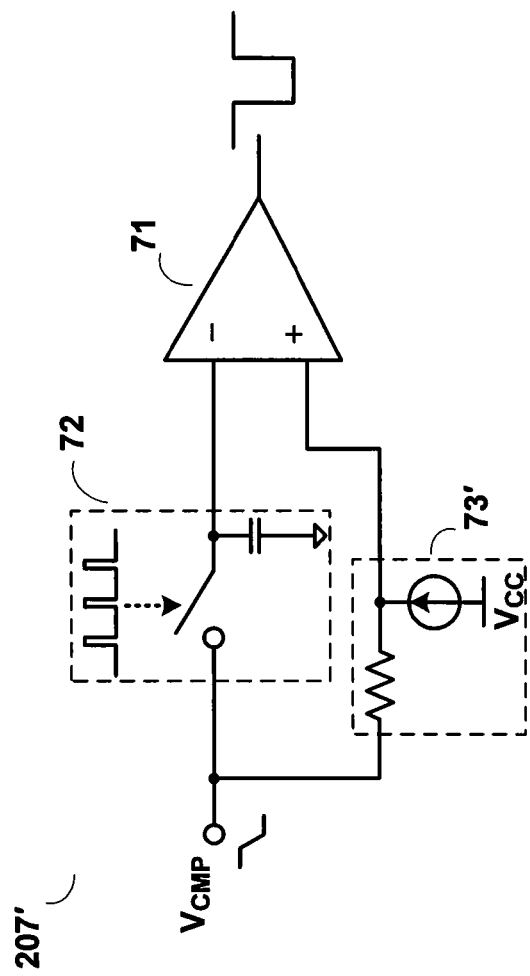
FIG. 7 illustrates a schematic circuit of a predicted step-down pulse unit 207' in accordance with yet another embodiment of the present technology.

FIG. 7 illustrates a schematic circuit of a predicted step-down pulse unit 207' in accordance with yet another embodiment of the present technology. Different to the predicted step-down pulse unit 207 in FIG. 6, the second bias circuit 73' in the predicted step-down pulse unit 207' adopts a resistor and a current source instead of a voltage source.

In one embodiment, the second bias circuit 73' includes a resistor coupled between the COMP signal ($V_{CMP}$) and the non-inverting input terminal of the comparator 71, and a current source coupled between the non-inverting input terminal of the comparator 71 and the reference voltage. The current source provides a current flow from the reference voltage, so as to insure the voltage at the non-inverting input of the comparator is higher than the COMP signal ($V_{CMP}$) in steady state. The operation principle of the predicted step-down pulse unit 207' is generally similar to that of the predicted step-down pulse unit 207.

Figure 8:
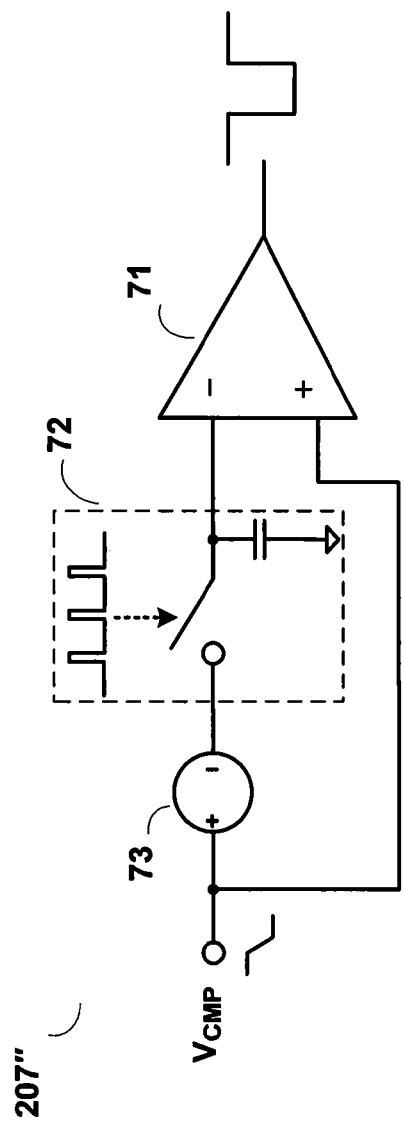
FIG. 8 illustrates a schematic circuit of a predicted step-down pulse unit 207" in accordance with yet another embodiment of the present technology.

FIG. 8 illustrates a schematic circuit of a predicted step-down pulse unit 207" in accordance with yet another embodiment of the present technology. Different to the predicted step-down pulse unit 207 in FIG. 6, the second bias circuit 73 in the predicted step-down pulse unit 207" is serially coupled to the sample-and-hold circuit 72 between the COMP signal ($V_{CMP}$) and the inverting input terminal of the comparator 71, so as to bias the voltage at the inverting input terminal of the comparator to be higher than the COMP signal ($V_{CMP}$) when the switching mode power supply 200 is in a steady state. Thus, the COMP signal ($V_{CMP}$) is first biased by the second bias circuit 73 to get a second bias signal lower than the COMP signal ($V_{CMP}$). Then the second bias signal is held by the sample-and-hold circuit 72 to get a sample-held signal. In addition, the non-inverting input terminal of the comparator 71 in the predicted step-down pulse unit 207" is coupled to the COMP signal ($V_{CMP}$). The operation principle of the predicted step-down pulse unit 207" is generally similar to that of the predicted step-down pulse unit 207.

Figure 9:
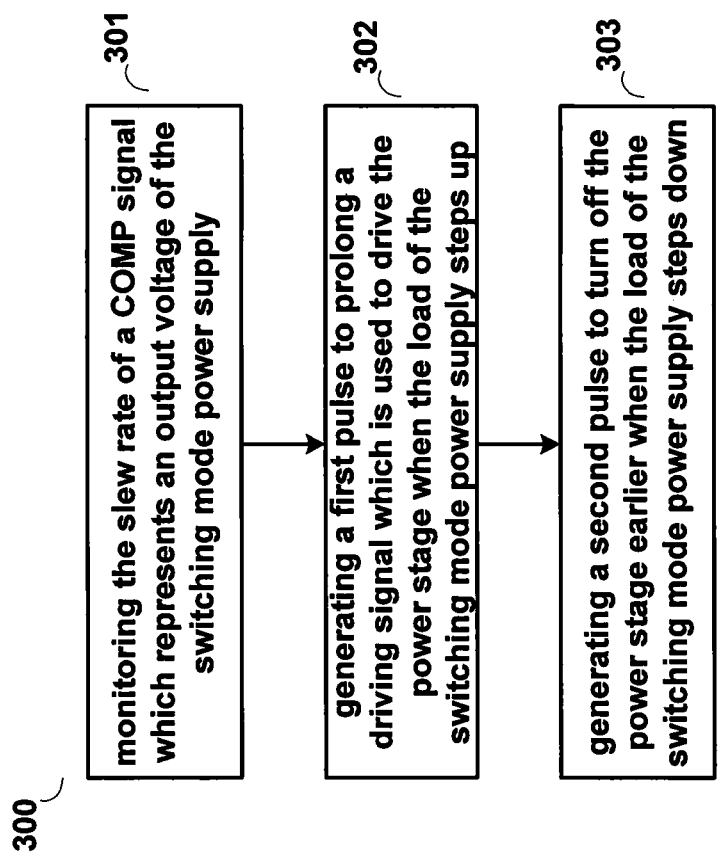
FIG. 9 illustrates a schematic flowchart 300 of a method for a switching mode power supply in accordance with yet another embodiment of the present technology.

FIG. 9 is a schematic flowchart 300 of a method for operating a switching mode power supply. As shown in FIG. 9, the method comprises: at stage 301, monitoring the slew rate of a COMP signal which represents an output voltage of the switching mode power supply; at stage 302, generating a first pulse to prolong a driving signal which is used to drive the power stage when the load of the switching mode power supply steps up; and at stage 303, generating a second pulse to turn off the power stage when the load of the switching mode power supply steps down.

In one embodiment, generating a first pulse further comprises holding the COMP signal to get a sample-held signal; biasing the COMP signal to get a first bias signal lower than the COMP signal; and comparing the sample-held signal with the first bias signal. In another embodiment, generating a first pulse further can also comprise biasing the COMP signal to get a first bias signal higher than the COMP signal; holding the first bias signal to get a sample-held signal; and comparing the sample-held signal with the COMP signal.

In one embodiment, generating a second pulse can comprise holding the COMP signal to get a sample-held signal; biasing the COMP signal to get a second bias signal higher than the COMP signal; and comparing the sample-held signal with the bias signal. In another embodiment, generating a second pulse can also comprise biasing the COMP signal to get a second bias signal lower than the COMP signal; holding the second bias signal to get a sample-held signal; and comparing the sample-held signal with the COMP signal.

From the foregoing, it will be appreciated that specific embodiments of the technology have been described herein for purposes of illustration, but that various modifications may be made without deviating from the disclosure. Many of the elements of one embodiment may be combined with other embodiments in addition to or in lieu of the elements of the other embodiments. Accordingly, the disclosure is not limited except as by the appended claims.

We claim:

1. A switching mode power supply, comprising:
   a power stage configured to receive an input voltage and convert the input voltage to an output voltage to a load based on a driving signal;
   a feedback circuit operatively coupled to the load, the feedback circuit being configured to provide a feedback signal derived from the load;
   an error amplifier configured to receive the feedback signal and a voltage reference and provide a COMP signal based thereon, the COMP signal having a rising slew rate and a falling slew rate;
   a PWM generator configured to receive the COMP signal and generate a PWM signal based on the received COMP signal;

a predicted PWM circuit configured to receive the COMP signal and the PWM signal and provide a predicted PWM signal based on the PWM signal and at least one of the rising slew rate and the falling slew rate of the COMP signal; and a driver configured to receive the predicted PWM signal and provide the driving signal to the power stage based on the received predicted PWM signal.

2. The switching mode power supply of claim 1, wherein the predicted PWM circuit comprises:

a predicted step-up pulse unit configured to receive the COMP signal and provide a first pulse when the rising slew rate of the COMP signal is higher than a first preset value; and a predicted step-down pulse unit configured to receive the COMP signal and provide a second pulse when the falling slew rate of the COMP signal is higher than a second preset value.

3. The switching mode power supply of claim 2, wherein the predicted PWM circuit further comprises:

a logical OR unit configured to receive the first pulse and the PWM signal and provide a predicted step-up PWM signal based on the first pulse and the PWM signal; and a logical AND unit configured to receive the second pulse and the predicted step-up PWM signal and provide the predicted PWM signal based on the second pulse and the predicted step-up PWM signal.

4. The switching mode power supply of claim 2, wherein the predicted PWM circuit further comprises:

a logical AND unit configured to receive the second pulse and the PWM signal and provide a predicted step-down PWM signal based on the first pulse and the PWM signal; and a logical OR unit configured to receive the first pulse and the predicted step-down PWM signal and provide the predicted PWM signal based on the first pulse and the predicted step-down PWM signal.

5. The switching mode power supply of claim 1, wherein the predicted PWM circuit comprises:

a predicted step-up pulse unit configured to receive the COMP signal and provide a first pulse when the rising slew rate of the COMP signal is higher than a first preset value; and a logical OR unit configured to receive the first pulse and the PWM signal, and provide the predicted PWM signal based on the first pulse and the PWM signal.

6. The switching mode power supply of claim 1, wherein the predicted PWM circuit comprises:

a predicted step-down pulse unit configured to receive the COMP signal and provide a second pulse when the falling slew rate of the COMP signal is higher than a second preset value; and a logical AND unit configured to receive the second pulse and the PWM signal and provide the predicted PWM signal based on the second pulse and the PWM signal.

7. The switching mode power supply of claim 2, wherein the predicted step-up pulse unit comprises a sample-and-hold circuit operable at a frequency, a comparator having a first input terminal and a second input terminal, and a first bias circuit, and wherein:

the sample-and-hold circuit is configured to receive the COMP signal and provide a sample-held signal based on the COMP signal;

the first bias circuit is coupled between the COMP signal and the first input terminal of the comparator and configured to apply a bias voltage that is lower than the COMP signal to the first input terminal of the comparator;

the comparator is configured to receive the sample-held signal at the second input terminal; and the first preset value is determined based on the bias voltage of the first bias circuit and the frequency of the sample-and-hold circuit.

8. The switching mode power supply of claim 2, wherein the predicted step-up pulse unit comprises a sample-and-hold circuit operable at a frequency, a comparator having a first input terminal and a second input terminal, and a first bias circuit, and wherein:

the sample-and-hold circuit and the first bias circuit are coupled in series between the COMP signal and the first input terminal of the comparator and configured to apply a bias voltage that is higher than the COMP signal to the first input terminal of the comparator when the switching mode power supply is in a steady state;

the second input terminal of the comparator is coupled to the COMP signal; and the first preset value is determined based on the bias voltage of the first bias circuit and the frequency of the sample-and-hold circuit.

9. The switching mode power supply of claim 2, wherein the predicted step-down pulse unit comprises a sample-and-hold circuit operable at a frequency, a comparator having a first input terminal and a second input terminal, and a second bias circuit, and wherein:

the sample-and-hold circuit is configured to receive the COMP signal, and provide a sample-held signal based on the COMP signal;

the second bias circuit is coupled between the COMP signal and the first input terminal of the comparator and configured to apply a bias voltage that is higher than the COMP signal to the first input terminal of the comparator;

the comparator receives the sample-held signal at the second input terminal; and the second preset value is determined based on the bias voltage of the second bias circuit and the frequency of the sample-and-hold circuit.

10. The switching mode power supply of claim 2, wherein the predicted step-down pulse unit comprises a sample-and-hold circuit operable at a frequency, a comparator having a first input terminal and a second input terminal, and a second bias circuit, and wherein:

the sample-and-hold circuit and the second bias circuit are coupled in series between the COMP signal and the first input terminal of the comparator and configured to apply a bias voltage that is lower than the COMP signal to the first input terminal of the comparator when the switching mode power supply is in a steady state;

the second input terminal of the comparator is coupled to the COMP signal; and the second preset value is determined based on the bias voltage of the second bias circuit and the frequency of the sample-and-hold circuit.

11. A switching mode power supply, comprising:

means for converting an input voltage to an output voltage in response to a driving signal;

means for providing a feedback signal related to the output voltage;

means for providing a COMP signal having a rising slew rate and a falling slew rate in response to the feedback signal and a voltage reference;

means for generating a PWM signal in response to the COMP signal;
means for generating a predicted PWM signal in response to the COMP signal and the PWM signal; and
means for providing the driving signal in response to the predicted PWM signal.

12. The switching mode power supply of claim 11, wherein means for generating the predicted PWM signal comprises:
means for monitoring the rising slew rate of the COMP signal and generating a first pulse when the rising slew rate of the COMP signal is higher than a first preset value; and
means for monitoring the falling slew rate of the COMP signal and generating a second pulse when the falling slew rate of the COMP signal is higher than a second preset value.

13. The switching mode power supply of claim 12, wherein means for generating the predicted PWM signal further comprises:
means for providing a predicted step-up PWM signal in response to the first pulse and the PWM signal; and
means for providing the predicted PWM signal in response to the second pulse and the predicted step-up PWM signal.

14. The switching mode power supply of claim 12, wherein means for generating the predicted PWM signal further comprises:
means for providing a predicted step-down PWM signal in response to the second pulse and the PWM signal; and
means for providing the predicted PWM signal in response to the first pulse and the predicted step-down PWM signal.

15. The switching mode power supply of claim 11, wherein means for generating the predicted PWM signal comprises:
means for monitoring the rising slew rate of the COMP signal and generating a first pulse when the rising slew rate of the COMP signal is higher than a first preset value; and
means for providing the predicted PWM signal in response to the first pulse and the PWM signal.

16. The switching mode power supply of claim 11, wherein means for generating the predicted PWM signal comprises:
means for monitoring the falling slew rate of the COMP signal and generating a second pulse when the falling slew rate of the COMP signal is higher than a second preset value; and
means for providing the predicted PWM signal in response to the second pulse and the PWM signal.

17. The switching mode power supply of claim 12, wherein means for monitoring the rising slew rate of the COMP signal and generating the first pulse comprises:
means for holding the COMP signal to get a sample-held signal;
means for biasing the COMP signal to get a first bias signal, wherein the first bias signal is lower than the COMP signal; and
means for comparing the sample-held signal with the first bias signal to get the first pulse.

18. The switching mode power supply of claim 12, wherein means for monitoring the rising slew rate of the COMP signal and generating the first pulse comprises:
means for biasing the COMP signal to get a first bias signal, wherein the first bias signal is higher than the COMP signal;
means for holding the first bias signal to get a sample-held signal; and
means for comparing the sample-held signal with the COMP signal to get the first pulse.

19. The switching mode power supply of claim 12, wherein means for monitoring the falling slew rate of the COMP signal and generating the second pulse comprises:
means for holding the COMP signal to get a sample-held signal;
means for biasing the COMP signal to get a second bias signal, wherein the second bias signal is higher than the COMP signal; and
means for comparing the sample-held signal with the second bias signal to get the second pulse.

20. The switching mode power supply of claim 12, wherein means for monitoring the falling slew rate of the COMP signal and generating the second pulse comprises:
means for biasing the COMP signal to get a second bias signal, wherein the second bias signal is lower than the COMP signal;
means for holding the second bias signal to get a sample-held signal; and
means for comparing the sample-held signal with the COMP signal to get the second pulse.

21. A method of operating a switching mode power supply having a power stage, the method comprising:
monitoring a slew rate of a COMP signal corresponding to an output voltage of the switching mode power supply;
generating a first pulse to prolong an ON state of the power stage when a load of the switching mode power supply steps up; and
generating a second pulse to turn off the power stage when the load of the switching mode power supply steps down.

22. The method of claim 21, wherein generating the first pulse comprises:
holding the COMP signal to obtain a sample-held signal;
biasing the COMP signal to obtain a first bias signal lower than the COMP signal; and
comparing the sample-held signal with the first bias signal.

23. The method of claim 21, wherein generating the first pulse comprises:
biasing the COMP signal to obtain a first bias signal higher than the COMP signal;
holding the first bias signal to obtain a sample-held signal; and
comparing the sample-held signal with the COMP signal.

24. The method of claim 21, wherein generating the second pulse comprises:
holding the COMP signal to obtain a sample-held signal;
biasing the COMP signal to obtain a second bias signal higher than the COMP signal; and
comparing the sample-held signal with the second bias signal.

25. The method of claim 21, wherein generating the second pulse comprises:
biasing the COMP signal to obtain a second bias signal lower than the COMP signal;
holding the second bias signal to obtain a sample-held signal; and
comparing the sample-held signal with the COMP signal.

* * * * *